(No Model.) 2 Sheets—Sheet 1.
D. E. BARTON.
WASHING AND CLEANING APPARATUS FOR FRUIT.
No. 508,860. Patented Nov. 14, 1893.
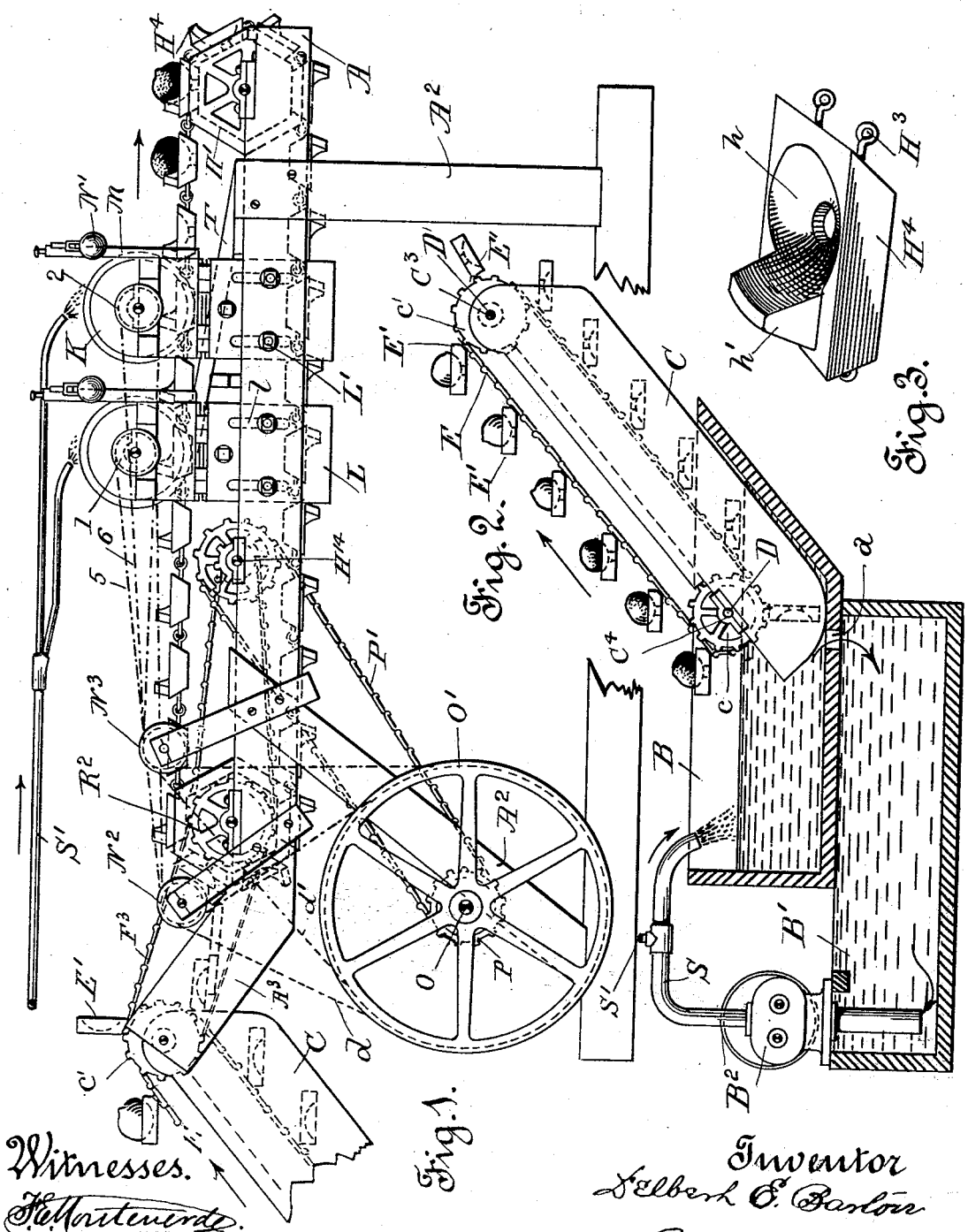

(No Model.) 2 Sheets—Sheet 2.
D. E. BARTON.
WASHING AND CLEANING APPARATUS FOR FRUIT.
No. 508,860. Patented Nov. 14, 1893.
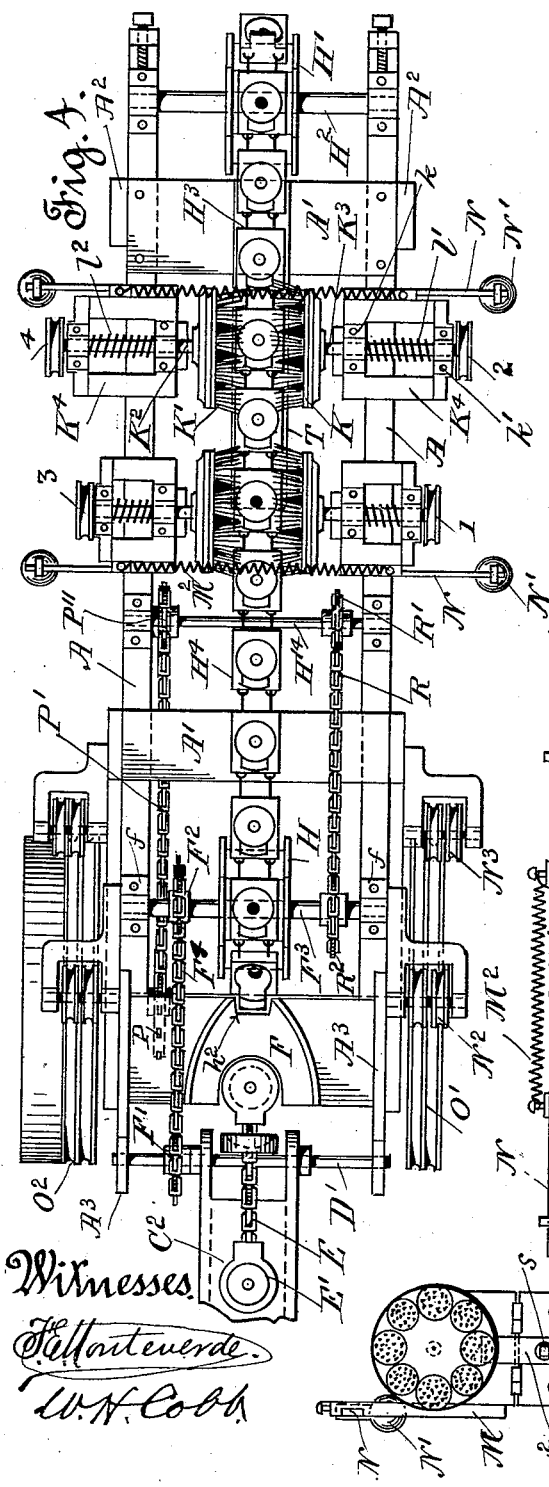
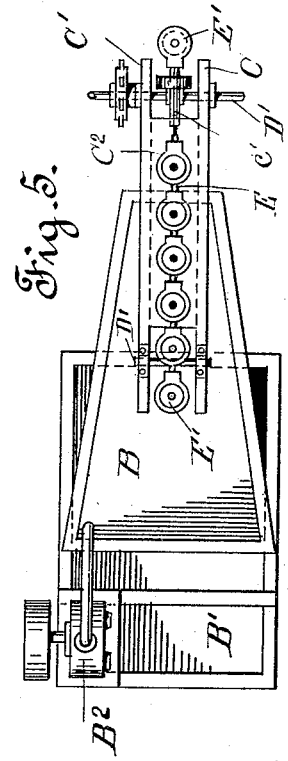
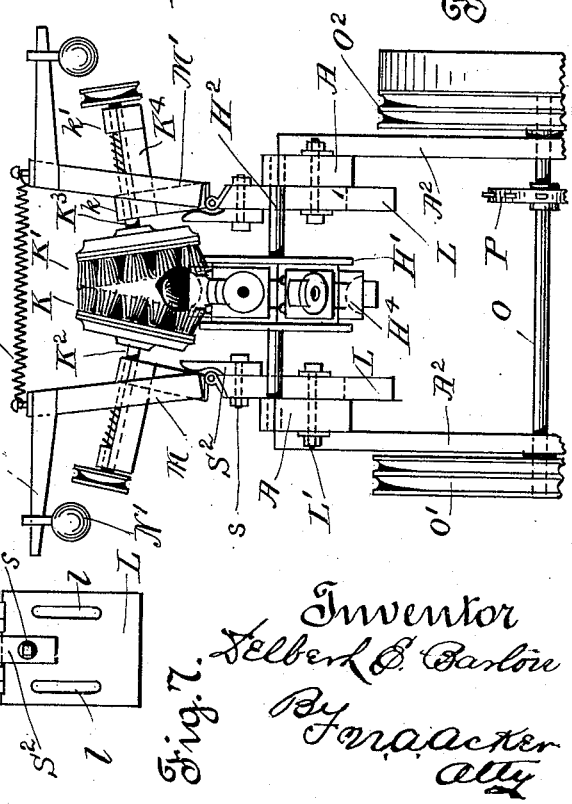
Witnesses
H. Monteverde
W. H. Cobb
Inventor
Delbert E. Barton
By F. A. Acker
Atty

UNITED STATES PATENT OFFICE.

DELBERT E. BARTON, OF LOS ANGELES, CALIFORNIA.

WASHING AND CLEANING APPARATUS FOR FRUIT.

SPECIFICATION forming part of Letters Patent No. 508,860, dated November 14, 1893.

Application filed May 1, 1893. Serial No. 472,490. (No model.)

*To all whom it may concern:*

Be it known that I, DELBERT E. BARTON, a citizen of the United States, residing at Los Angeles, in the county of Los Angeles and State of California, have invented certain new and useful Improvements in Washing and Cleaning Apparatus for Fruit; and I do hereby declare the following to be a full, clear, and exact description of said invention, such as will enable others skilled in the art to which it most nearly appertains to make, use, and practice the same.

This invention relates to a certain new and useful apparatus for washing and cleaning of fruit, which consists in the arrangement of parts and details of construction as will be hereinafter more fully set forth in the drawings, described and pointed out in the specification.

The object of the present invention is to first thoroughly wash the fruit and then clean the same before permitting the fruit to pass from the machine, which object is accomplished by the use of the apparatus illustrated in the accompanying drawings.

This apparatus is designed more especially for use in connection with the cleaning of oranges, although it is equally adapted for the cleaning of any similar fruit.

In order to more fully understand my invention, reference must be had to the accompanying drawings, wherein like letters of reference denote corresponding parts.

Figure 1, is a side elevation of the machine, showing the washing device removed and fruit elevator partly broken away; Fig. 2, a sectional side elevation of the washing device in order to more fully illustrate position of fruit elevator. Fig. 3, is a perspective view of one of the fruit carrier cups; Fig. 4, a top plan of Fig. 1; Fig. 5, a similar view of Fig. 2. Fig. 6, is an end elevation of Fig. 4; and Fig. 7, is a side elevation of one of the revolving brushes, viewed from the inside.

The frame of my machine consists of the longitudinal side pieces A, which are united by the cross pieces A', and supported by the legs or uprights $A^2$, as shown in Fig. 1. In front of the frame is located the washing receptacle B, which is designed to receive the fruit and wash same before being fed to the cleaning device. Below the washing receptacle is located the catch basin B', and communication between the receptacle B, and catch basin is had by the outlet opening $a$. The water from the catch basin is conveyed into receptacle B by any suitable device, preferably through the medium of the force pump $B^2$. As the water passes from receptacle B, into the catch basin B', through opening $a$, there is naturally created a current, which serves to convey the fruit to the elevator. This bathing of the fruit washes or frees same of all dirt which may be thereon. The fruit is kept agitated within the receptacle B, by the continuous motion of the water. By causing the water to flow into the catch basin B', from the receptacle B, and forcing the same therein again, I am enabled to utilize the water over and over again.

Within the receptacle B projects the lower end of the fruit elevator, which consists of the side pieces C, C', united by top pieces $C^2$. Within suitable bearings $C^3$, $C^4$, at each end of the elevator, work the shafts D, D', upon which shafts I secure sprocket wheels $c$, $c'$, over which works the endless belt E. To this belt is attached any number of fruit holding cups or buckets E', which cups or buckets are so attached to the endless belt as to lie in a horizontal position when traveling upon the conveyer frame; otherwise the fruit would roll from within the buckets when traveling up an incline. As the endless belt is carried over the sprocket wheels, the cups or buckets E', are likewise carried, and as same moves around shaft D, the buckets pick the fruit up, which is drawn thereto by the current of the water within the receptacle B. The fruit is then carried upward and deposited within guide F, which is located at the forward end of the machine in order to receive the fruit as the same rolls from within the cups E', when the belt E, is carried over sprocket wheel $c'$. The outer ends of shaft D', work in bearings within upper end of inclined side pieces $A^3$, which pieces constitute a continuation of side pieces A, and upon said shaft is secured the sprocket wheel F', which communicates with sprocket wheel $F^2$, secured upon shaft $F^3$, which works in bearing $f$, between the forward end of side pieces A, by means of sprocket chain $F^4$. This shaft is rotated in order to operate shaft D', and fruit conveyer or belt, in the hereinafter described manner.

At each end of the machine frame I locate the drums H, H' preferably hexagon in shape, which are secured upon shafts $F^3$, $H^2$, working in suitable bearings. Over these drums works the endless fruit carrying belt $H^3$, which may consist of a series of buckets $H^4$, linked together, or a plate chain with a series of buckets attached thereto, although I prefer to form the belt by simply linking the buckets together, as shown. These buckets are provided with the cut-away seat portion $h$, and upwardly extending back piece $h'$. By providing this back piece to the bucket, the fruit is prevented from being forced therefrom while passing through the cleaning brushes, which it would otherwise do. As this endless belt travels over drums H, H', each of the fruit buckets $H^4$, passes between outlet $h^2$, of fruit receiving guide F, and receives or picks up an orange, or other fruit, and carries same forward between the cleaning brushes, by which all dirt is removed, and finally discharges same from the machine into any suitable receptacle located under drum H'. By forming the receiving guide F, which may be constructed similar to an open box, with a reduced outlet, only one orange can make its escape at a time.

In order to assure the perfect cleaning of the fruit, I provide my machine with two pairs of revolving brushes K, K' each of which is secured to shaft $K^2$, $K^3$, which shafts work in bearings $k$, $k'$ of open frame $K^4$. Each of the revolving brushes being constructed and working in the same manner it will not be necessary to describe each separately. To the projecting end of the four shafts or axles $K^2$, $K^3$, is secured the pulley wheels 1, 2, 3, 4. The open frame $K^4$, is hinged to support L, which is secured to the frame of the machine by means of bolt L'. These bolts pass through slots $l$, cut in said supports. Consequently by loosening the same, the support may be raised or lowered. This adjustment permits of the brushes being raised or lowered in accordance with the size of the fruit to be cleaned. By hinging the open frame to the support, I permit the brushes to automatically move in or out. If the brushes be not permitted to automatically adjust to or from each other the fruit will be liable to be bruised while passing between the same. Upon the shafts or axles $K^2$, $K^3$, is secured the spiral springs $l'$, $l^2$, between bearings $k$, $k'$. The resiliency of these springs maintains a constant pressure upon the rotary brushes and serves to force the same tightly against the fruit, at the same time permitting the brushes to move toward or from each other as the fruit is carried along.

To the side of open frames $K^4$, is attached the upwardly extending arms or standards M, M', which are connected together, at the top, by the spring $M^2$. This spring maintains a constant pressure upon the arms or standards M, M', and the pressure thereof serves to move the hinged frame in or out in accordance with the movement of the rotary brushes. From the standards M, M' project the rods N, upon which work the weights N'. As the weights are moved in or out they increase or decrease the leverage power of the standards M, M', hence imparting greater resistance to the rotary brushes, through the medium of the hinged frame $K^4$. It is necessary that means be provided for adjusting the pressure of these brushes; otherwise the fruit which is carried therebetween would be liable to receive injury, owing to the fact that all fruit cannot be subjected to the same amount of pressure, for the reason that the skin of one may be much softer than that of another. These also serve to limit the inward movement of the brushes, thus giving an adjustment thereto for varying sizes of fruit. It will thus be seen that through the medium of the hinged frame $K^4$, the brushes automatically adjust themselves to the size of the fruit passing therebetween, but the limit of such automatic adjustment is controlled by the adjustable weights. As the fruit is carried between the oppositely rotating brushes, by the travel of the endless belt, the same is thoroughly cleaned.

By providing the fruit holding cups, with the raised back $h'$, the fruit is kept firmly within the cup while being cleaned.

Through the forward portion of the machine frame, works, within suitable bearing, shaft O, which has secured upon the ends thereof grooved driving wheels O', $O^2$. From each of these grooved driving wheels extend the endless driving cords $d$, $d'$, which pass over grooved pulley wheels $N^2$, $N^3$, and transmit the motion to said wheels.

From grooved wheels $N^2$, $N^3$, motion is imparted to pulley wheels 1, 2, 3 and 4 and rotary brushes, through the medium of drive cords 5 and 6. By crossing the cords an opposite rotation will be imparted to wheels 3 and 4 from that given wheels 1 and 2. This being the usual manner of transmitting power, forms no part of my invention. Upon shaft O, is also located sprocket wheel P, and motion is imparted therefrom to shaft $H^{14}$ through the medium of chain P', which works over wheel P and sprocket wheel P'', located upon shaft $H^{14}$. The motion of shaft $H^{14}$, is imparted to shaft $F^3$, in order to operate the fruit carrier belt, by means of chain R, which works over sprocket wheels R', $R^2$, as shown.

In order to maintain the endless fruit carrier belt in true line, I provide the guide T, which consists of two upright pieces which are secured to the frame of the machine and project on each side of the carrier belt. This guide keeps the belt from being moved to one side, hence causes same to travel directly between the brushes.

From the discharge pipe S, of the force pump, extends the supply pipe S', which conveys water to the brushes K, K', in order that the fruit passing therethrough may be kept wet while being cleaned so as to soften all dirt thereon, thus assuring the removal thereof, while being acted on by the brushes.

Having thus described my invention, what I claim as new, and desire to secure protection in by Letters Patent, is—

1. In a fruit cleaning machine, the combination with the washing receptacle, of the elevator for conveying the fruit from the washing receptacle the guide receiver, the endless carrier, of the rotary brushes, and operating mechanism adapted to impart motion to the endless carrier and the brushes.

2. In a fruit cleaning machine, the combination with the washing receptacle, of the elevator forming connection between the washing receptacle and the cleaning devices, the endless belt working within said elevator, fruit holding cups secured to said belt so as to lie in a horizontal plane when carrying the fruit, and suitable mechanism for operating the endless belt.

3. In a fruit cleaner, the combination with the fruit washing receptacle, of the catch basin located thereunder and communicating therewith, means for forcing water from the basin into the washing receptacle, the elevator mechanism for automatically conveying the fruit from the washing apparatus to the cleaning brushes, and suitable mechanism for operating the same.

4. In a fruit-cleaning machine, the combination of a fruit receptacle, an endless elevator to convey the fruit therefrom, a guide receiving the fruit from the elevator, an endless carrier conveying the fruit from the receiving guide to the cleaning devices, and suitable operating mechanism.

5. In a fruit cleaning machine, the combination with the oppositely rotating cleaning brushes, of the endless carrying belt working between the cleaning brushes, of the fruit holding cups or buckets connected to said belt, of the back piece projecting upwardly from the bucket, of mechanism for operating the belt and brushes, and of a device for feeding the fruit to the bucket or cups.

6. A fruit-cleaning machine provided with an endless carrier consisting of a series of cups linked together and each provided with an upwardly projecting back piece.

7. In a fruit cleaning machine, the combination with the frame thereof, of the washing apparatus, of the fruit conveying device forming connection between the washing apparatus and the frame, of the guide receiver for receiving the fruit as discharged from the conveying device or elevator, of the drums located at each end portion of the frame, of the endless fruit carrying belt traveling thereover, of the cleaning brushes, and of mechanism for operating the endless belt and imparting opposite rotation to the cleaning brushes.

8. In a fruit cleaning machine, the combination with the fruit carrier, of the cleaning brushes, disposed vertically on opposite sides of the carrier, and mechanism for imparting opposite rotation to said brushes.

9. The combination with a fruit cleaning machine of the spring actuated cleaning brushes, and of mechanism for imparting opposite rotation to the brushes.

10. In a fruit cleaning machine, the combination with the fruit carrier, of the adjustable support, of the frame hinged thereto, of the spring actuated cleaning brushes, and of mechanism for imparting opposite rotation to the cleaning brushes.

11. In a fruit cleaning machine, the combination with the fruit carrier, of the adjustable support, of the swinging spring actuated cleaning brushes connected thereto, and of mechanism for imparting opposite rotation to the brushes.

12. In a fruit cleaning machine, the combination with the fruit carrier, of the guide for the carrier, of the spring actuated cleaning brushes, and of mechanism for imparting opposite rotation to the brushes.

13. In a fruit cleaning machine, the combination with the washing apparatus for the fruit, of the fruit elevator, of the receiving guide, of the endless fruit carrier, of the oppositely rotating brushes, of mechanism for operating the same, and of the water supply pipe for the brushes.

14. In a cleaning machine for fruit, the combination with the oppositely rotating spring actuated cleaning brushes, of the swinging frame within which the shaft of the brushes works, of the standard projecting from said frames, said standard provided with outwardly extending rods, and of the weight secured thereon.

In testimony whereof I affix my signature in presence of two witnesses.

DELBERT E. BARTON.

Witnesses:
W. A. ACKER,
WM. H. COBB.